June 25, 1968          M. N. KAPLAN          3,390,290
STATORLESS HOMOPOLAR MOTOR OR REACTION TORQUE GENERATOR
Filed Aug. 28, 1963          9 Sheets-Sheet 1

*INVENTOR.*

MARTIN N. KAPLAN

June 25, 1968     M. N. KAPLAN     3,390,290

STATORLESS HOMOPOLAR MOTOR OR REACTION TORQUE GENERATOR

Filed Aug. 28, 1963     9 Sheets-Sheet 2

*INVENTOR.*

MARTIN N. KAPLAN

June 25, 1968      M. N. KAPLAN      3,390,290
STATORLESS HOMOPOLAR MOTOR OR REACTION TORQUE GENERATOR
Filed Aug. 28, 1963      9 Sheets-Sheet 3

*INVENTOR.*

MARTIN N. KAPLAN

June 25, 1968  M. N. KAPLAN  3,390,290
STATORLESS HOMOPOLAR MOTOR OR REACTION TORQUE GENERATOR
Filed Aug. 28, 1963                                9 Sheets-Sheet 4

INVENTOR.

MARTIN N. KAPLAN

June 25, 1968    M. N. KAPLAN    3,390,290
STATORLESS HOMOPOLAR MOTOR OR REACTION TORQUE GENERATOR
Filed Aug. 28, 1963    9 Sheets-Sheet 5

INVENTOR.

MARTIN N. KAPLAN

June 25, 1968  M. N. KAPLAN  3,390,290
STATORLESS HOMOPOLAR MOTOR OR REACTION TORQUE GENERATOR
Filed Aug. 28, 1963  9 Sheets-Sheet 6

INVENTOR.

MARTIN N. KAPLAN

June 25, 1968    M. N. KAPLAN    3,390,290
STATORLESS HOMOPOLAR MOTOR OR REACTION TORQUE GENERATOR
Filed Aug. 28, 1963    9 Sheets-Sheet 7

*INVENTOR.*

MARTIN N. KAPLAN

June 25, 1968 M. N. KAPLAN 3,390,290
STATORLESS HOMOPOLAR MOTOR OR REACTION TORQUE GENERATOR
Filed Aug. 28, 1963 9 Sheets-Sheet 9

INVENTOR.

MARTIN N. KAPLAN

United States Patent Office 3,390,290
Patented June 25, 1968

3,390,290
STATORLESS HOMOPOLAR MOTOR OR
REACTION TORQUE GENERATOR
Martin Nathan Kaplan, San Diego, Calif.
(11610 Cantlay St., North Hollywood, Calif. 91605)
Filed Aug. 28, 1963, Ser. No. 305,122
6 Claims. (Cl. 310—156)

This invention relates to a simple embodiment of an electrodynamic generator or motor wherein the single member rotor and the field against which it reacts coexist in the same space.

Specifically, this invention relates to a statorless unipolar motor or generator wherein the rotor currents and the internal portion of the rotor created magnetic fields interact therein, causing that member to accelerate in rotation.

This single member which accelerates in rotation about its cylindrical axis when currents therein react with its internal magnetic field is hereby defined as and will hereinafter be called a statorless homopolar motor or a reaction torque generator. Where the statorless homopolar motor is made of high coercive force magnetic material such as Alnico V, the embodiment may be referred to as a "permant" type statorless homopolar motor or reaction torque generator and it will be understood that such is for use with D.-C. current. An electromagnetic type statorless homopolar motor or reaction torque generator will be described which functions with A.-C. as well as D.-C. current, and this may be referred to as an "electromagnetic" type statorless homopolar motor or reaction torque generator.

A primary purpose of this invention is to provide a direct means for demonstrating that an electric current flowing in and a magnetic field generated by a single member can react therein to cause that single member to accelerate in rotation.

The cylindrical rotor creates axially polarized or contrapolarized magnetic field components, symmetrically dispersed with respect thereto, which, for reasons which will become clearer as my invention is better understood, may be considered irrotational about the axis of symmetry in the inertial reference frame defining that axis, irrespective of rotor rotation about that axis.

Where the net internal field traversed by internal rotor currents is finite, the rotor will accelerate in rotation. Concurrently, because the electric currents must reach the rotor through circuitry traversing the external portion of the rotor-created magnetic field, an equal and opposite angular impulse will act thereon so the net angular momentum created in the complete electrical circuit and its supporting structures will be zero.

One normally skilled in the art of electrodynamic machines can readily make and use this invention in the various forms hereinafter described if he considers the rotor and the internal rotor currents to comprise one "free body system" the external circuitry through which electric currents reach the rotor, the currents flowing therein, the electric power source, and the necessary external physical supports to comprise a second "free body system," the rotor's internal and external magnetic fields may be considered a third elastic "free body system" with which the first and second free body currents counteract so as to produce no net moment thereon, said third "free body system" or any arbitrary part or section thereof can not be accelerated in rotation and may therefore be considered to remain irrotational with respect to the local inertial frame of reference; use of this concept will not invalidate the conclusions of an otherwise valid electrodynamic analysis.

The statorless homopolar motor or reaction torque generator may thus be considered as axially polarized or contra-polarized rotor whose internal currents react with an internal magnetic field which is irrotational about its axis of polarization.

Another purpose of this invention is to provide a direct means of demonstrating that the sole electrodynamic function of the stator element in a homopolar machine is to increase the effective magnetic field strength or the net field traversed by the rotor currents. In the "statorless" homopolar motor or reaction torque generator, the rotor generates torque even though there is no magnetic stator element present to generate a counter torque. Even in homopolar motors having magnetic stator elements, there is no torque reflected thereon, unless currents are present therein which traverse its field. Thus, the magnetic portion of the homopolar motor's stator, without providing any system counter torque, contributes to the magnitude of the rotor torque generated solely by increasing the intensity of rotor's internal magnetic field.

The statorless homopolar motor or reaction torque generator, when operated as a motor, appears to provide proof that torque is coupled through symmetrically dispersed magnetized space, lending credence to the belief that pure isotropic space has a structure. Thus, another purpose of my invention is to help provide means for demonstrating the realness of space by direct experiment using the induction field of the reaction torque generator as the vehicle.

Obvious uses for my invention include embodiments such as educational toys, games of skill, advertising novelties, and the like, as will be presently shown. Other uses will become clear as my invention becomes better understood. For example, reaction torque generators could be used to provide small torque in proportioned response to modest currents for the purpose of rotating light weight members such as reflectors in microwave or optics applications. Its function and some of its probable uses are outlined in the following drawings:

Other uses in keeping with the spirit of my invention will occur to those skilled in the art.

This device is the essence of electrodynamic simplicity and yet its characteristics were not predictable before the first model was actually tested. There remains much to be learned about the electric, magnetic, gravitational, and inertial energies and fields. This invention was conceived as the result of a continuing study in the quantized structure of these fields and the mechanics of their interactions. Specifically, the rotational characteristics of the symmetrically dispersed magnteic field about its axis of symmetry were under investigation using the system torques as a vehicle.

It was soon realized that the question of whether or not the symmetrical magnetic field could be made to rotate about its axis of symmetry could no more be solved by means of statorless homopolar motors than it could be resolved generally by means of closed circuits. It is now believed that this question can be finally settled experimentally by means of reaction torque generators employed in special arrangements in extremely high impedance circuits. Such means will constitute the basis of another application.

That the rotors symmetrical magnetic field does not rotate about its axis of symmetry. Thus, the rotor torque observed in the excited reaction torque generator is caused by the radially moving charge carriers being deflected by the axially directed internal irrotational magnetic field.

Figure 1:
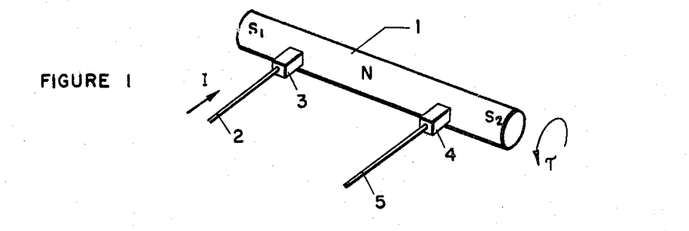
FIG. 1 is an isometric view of my invention showing a conducting, contrapolarized permanent type magnet, statorless homopolar motor or reaction torque generator suffering a torque in the presence of a current I.
Figure 2:
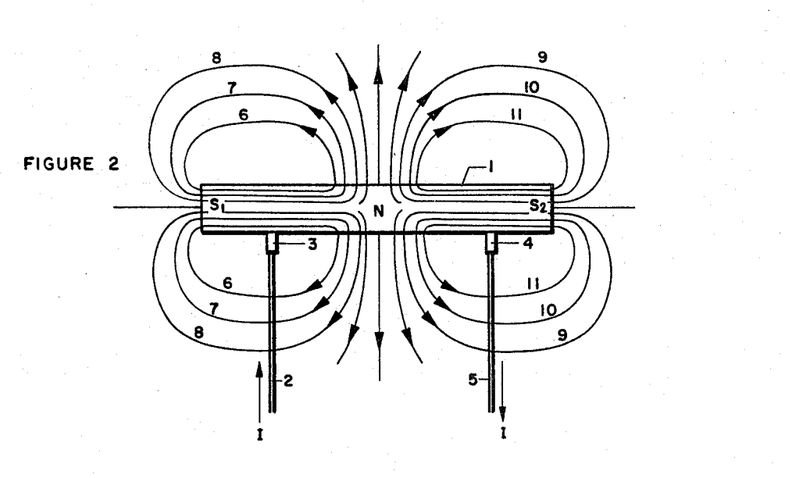
FIG. 2 is a schematic section showing the magnetic field and the radial currents which cross it.

FIG. 1 shows the cylindrical contrapolarized magnet 1 with electric current in the arrow direction being introduced therein through conductor 2 and contactor 3 approximately midway between poles $S_1$ and N and being extracted approximately midway between poles N and $S_2$ through contactor 4 and conductor 5. The sense of the torque generated will be in the counter-clockwise direction viewed in the $S_2$–N direction. A sectional view containing the axis of magnetic symmetry is provided in FIG. 2. This shows the "lines of force" to be nested toroidal-like closed surfaces. Charge carriers introduced into the rotor through contactor 3 cannot reach contactor 4 without penetrating the toroidal-like surfaces such as 6, 7, 8, and 9, 10, 11 inside the rotor. This is the reason that no unipolar generator or motor can employ multi-turn windings and are therefore low voltage high current machines.

Figure 3:
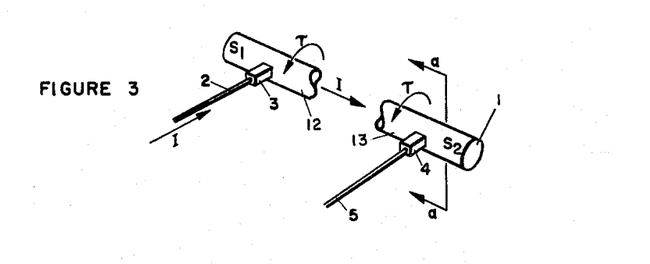
FIG. 3 is a cut-away view showing that the torques generated in the two halves of the statorless homopolar motor are additive.

In a cut-away view, FIG. 3 shows the statorless homopolar motor or reaction torque generator to be comprised of two ordinary circular cylindrical permanent magnets 12 and 13 co-axially mounted in tandem repulsion with provision made for axial current to flow between them. If the right hand convention be applied to the directions of the fields and their interacting currents as shown in the separate magnets of FIG. 3, it will be found that torques of the same sense are suffered by each and that when added, a resultant torque prevails.

Figure 4:
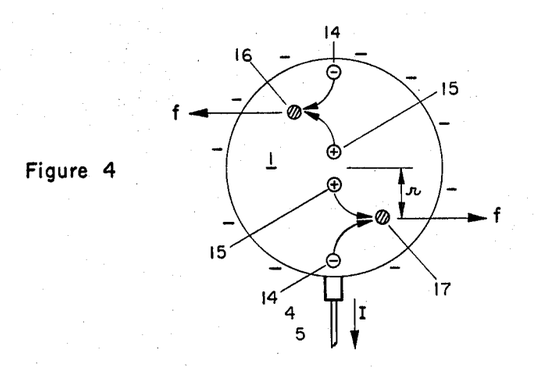
FIG. 4 is a section view perpendicular to the axis of symmetry showing how moblie charges are deflected in the statorless homopolar motor's internal magnetic field thus creating angular momentum and acceleration.

Radial motion of the charge carriers is portrayed in FIG. 4. Conduction electrons 14 accelerated radially inward by the prevailing potential gradient are deflected clockwise and thus suffer an angular acceleration. Any positively charged ions 15 present tend to move radially outward and in a like manner would be deflected counter-clockwise. The positively charged ions present would tend to recombine with the conduction electrons to form electrically neutral particles such as 16 and 17 having added rectilinear momentum MV in the directions of their local tangential velocity components. Each such recombination may be thought to occur at some distance R from the axis of symmetry and would constitute an impulse moment $$\Delta(\tau)(T) = \Delta(FR)(T) = \Delta(MAR)(T) =$$
$$\Delta\left(M\frac{V}{T}R\right)(T) = \Delta MVR$$

where $\tau$ is torque, T is time, F is force, R is length, M is mass, A is acceleration, V is velocity and $\Delta$ signifies that the expression is an increment of the whole.

Figure 5:
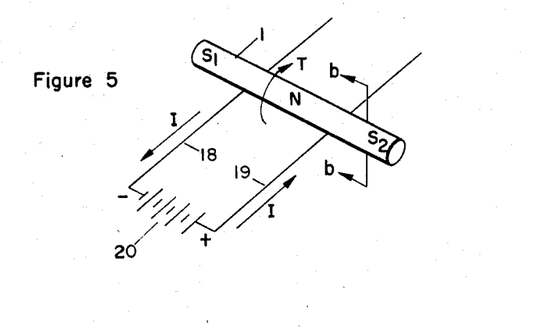
FIG. 5 is a view of a statorless homopolar motor showing how this device can be made to roll uphill on parallel conducting tracks.
Figure 6:
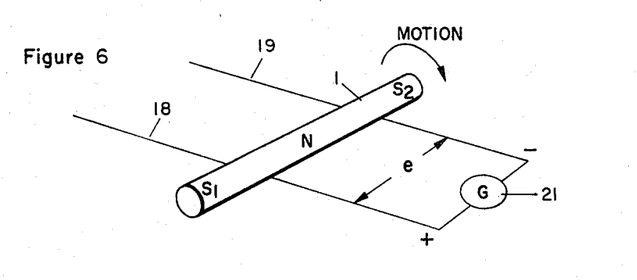
FIG. 6 illustrates a permanent type statorless homopolar motor rolling down-hill and generating an E.M.F. in the process.

If the conducting tracks 18 and 19 are electrically energized by battery 20 and caused to slope upward to the right with respect to the horizontal plane as shown in FIG. 5, the statorless homopolar motor or reaction torque generator 1 can be made to accelerate up-hill where the slopes involved are moderate. Where the reaction torque generator 1 is permitted to accelerate down-hill in a gravitational field, it will generate a tiny voltage of the sense indicated which can be detected by a sensitive electrometer 21 as in FIG. 6.

Figure 7:
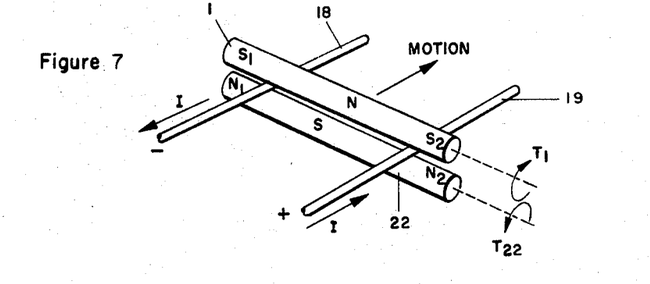
FIG. 7 is a view showing a mating contrapolarized permanent magnet type statorless homopolar motor suspended below the conducting tracks in the magnetic fields of another statorless homopolar motor where in response to D.-C. excitation thereon, the resultant torques cause the two motors to roll along the track in the direction indicated.

Magnetically polarized as shown in FIG. 7, statorless homopolar motor or reaction torque generator 22 may be suspended below tracks 18 and 19 in the magnetic field of statorless homopolar motor or reaction torque generator 1. When electrically energized as shown, generator 1 will torque clockwise and generator 22 will torque counter-clockwise. Because they are on opposite sides of tracks 18 and 19, they will roll along the tracks together in the direction of the motion indicated.

Figure 8:
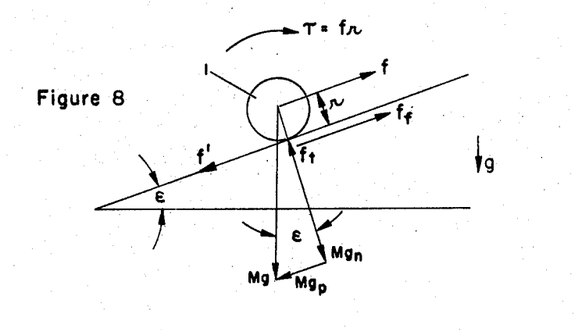
FIG. 8 is a section view of FIG. 5 at (B—B) showing the mechanics which govern statorless homopolar motor's motion.

The mechanical forces involved in the statorless homopolar motor or reaction torque generator arrangement of FIG. 5, are given in FIG. 8. Gravitation acts on generator 1 in the G direction with a force equal to MG. This resolves into a force $MG_N$ normal to and a force $MG_P$ parallel to tracks 18 and 19. Component $MG_N$ plays no part in the dynamics of statorless homopolar motor 1 beyond the effects it has on contact resistance and system traction. Statorless homopolar motor 1 produces counterclockwise torque $\tau$ in direct proportion to the product of its radial current I and its total field $2\pi R^2 \beta$ where R is its radius and $\beta$ is its mean axial magnetic flux density. Thus:

$$\tau = 2\pi K R^2 \beta I \quad (1)$$

The torque $\tau$ may be equated to the couple F, F' where F is directed through the generator's center of mass and F' acts parallel to tracks 18 and 19 as shown at the point of tangency. A frictional force $F_F$ between the surface of statorless homopolar motor 1 and track surfaces reacts on F' to provide traction. Thus:

$$\tau = K(2\pi R^2)\beta I = FR \quad (2)$$

from which $$I = \frac{GM \sin \epsilon}{2\pi K R \beta}$$

when $\pi R^2 H \rho$ is substituted for M, $$I = \frac{G\rho R H \sin \epsilon}{2K\beta} = K' \frac{\sin \epsilon}{\beta} \quad (3)$$

where

G is acceleration due to gravity,
$\rho$ is generator density,
R is generator radius,
H is generator length,
K is a constant of proportionality, and
K' is a simplified constant for a given reaction torque generator, i.e., $$K' = \frac{G\rho R H}{2K}$$

Figure 9:
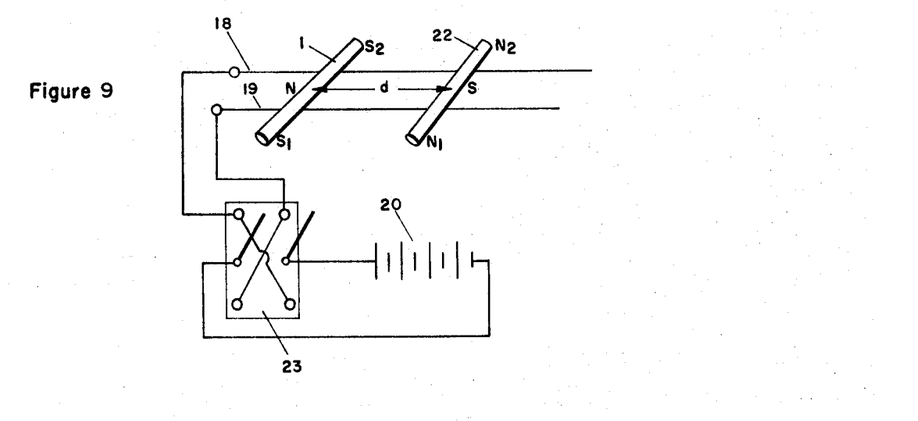
FIG. 9 is a view showing mating permanent type statorless homopolar motors at rest on horizonal conducting tracks with sufficient separation so that the system friction prevents them from rolling together.
Figure 10:
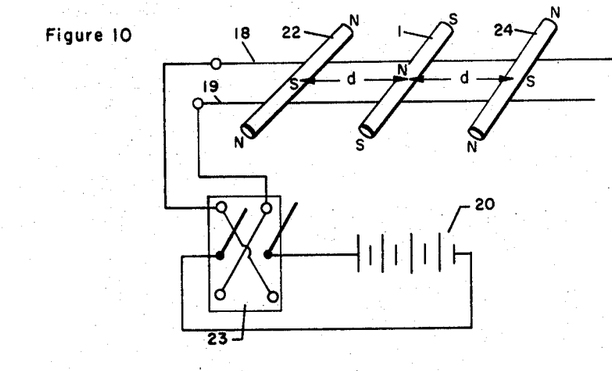
FIG. 10 is a view showing three reacting torque generators sufficiently separated so that system friction prevents them from moving without additional impetus.

An interesting demonstration can be performed by placing mating statorless homopolar motors 1 and 22 on a level track as shown in FIG. 9 with sufficient separation D so that system frictions suffice to keep them from rolling together. If track 18 is now made several volts negative with respect to track 19, by means of reversing switch 23, statorless homopolar motors 1 and 22 will roll together whereas if the reverse polarity is impressed, they will roll apart. This demonstration may be performed using statorless homopolar motors 1, 22, and 24 as shown in FIG. 10. In this instance, statorless homopolar motor 1 can be made to roll toward either statorless homopolar motor 22 or 24 depending upon track polarity.

Figures 11, 12:
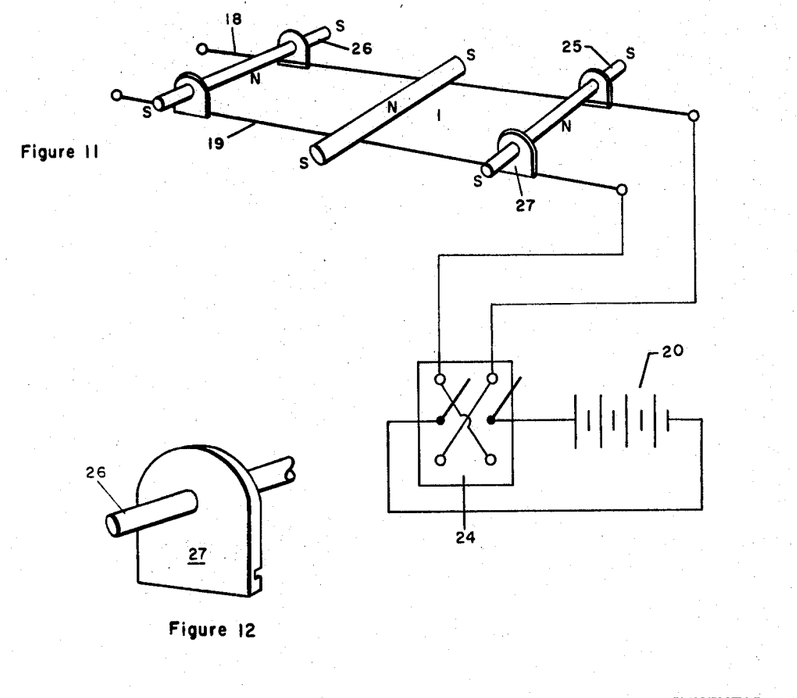
FIG. 11 is a view showing three contrapolarized permanent magnets where only one is employed as a reaction torque generator.
FIG. 12 is a detail showing the insulating fastener used to secure the contrapolarized magnets to the parallel tracks.

Statorless homopolar motor 1 and contrapolarized magnets 25 and 26 polarized as shown in FIG. 11 can be employed in a different manner. Contrapolarized permanent magnets 25 and 26 are supported by but insulated from tracks 18 and 19. A detail showing the insulating fastener 27 used to secure the contrapolarized magnets to the parallel tracks is shown in FIG. 12. This restricts statorless homopolar motor 1 to a given area in which it can roll relatively freely between contrapolarized magnets 25 and 26. However, as it approaches either, their mutual magnetic fields repel and statorless homopolar motor 1 will be decelerated accordingly. Where the fields of 25 and 26 are identical, statorless homopolar motor 1 would tend to occupy a position midway between them when not electrically energized. Thus, this arrangement gives a means for controlling the position of statorless homopolar motor 1 employing magnetic restoring forces.

Figure 13:
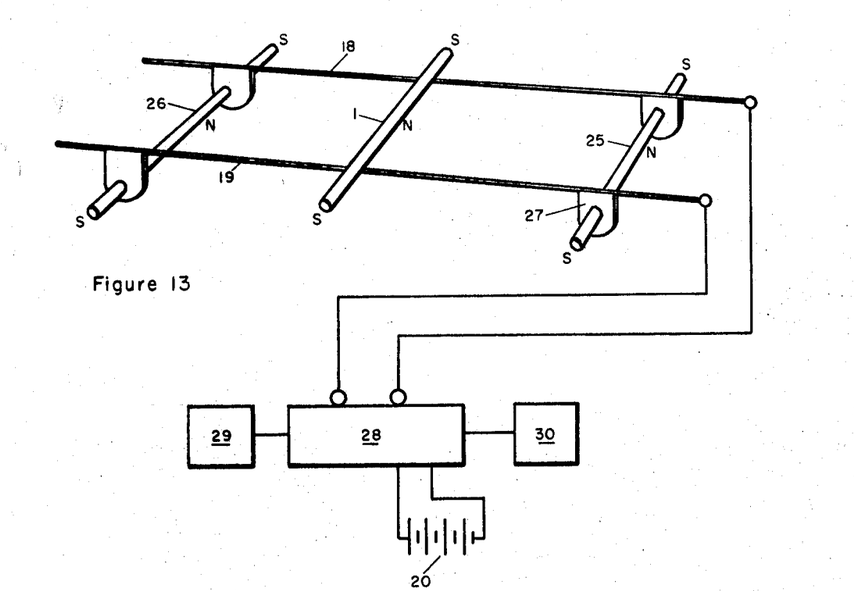
FIG. 13 is a variation of FIG. 11 which can be used as the basis for a game of skill.

A variation of the invention's use in FIG. 11 can be used as the basis for a game of skill and is shown in FIG. 13. Here, statorless homopolar motor 1 can be caused to move alternately in opposing directions by switches 29 and 30 when respectively energized by timer relay 28. Opposing players would close their respective switches when this would enhance their chances to get the statorless homopolar motor into their opponent's end zone, i.e., into the track lengths beyond the playing field. By bringing the statorless homopolar motor to a sufficiently high velocity, a player could penetrate the magnetic barrier and win points by outmaneuvering his opponent.

In another game of skill, not shown, a statorless homopolar motor 1, parallel tracks 18 and 19, and contrapolarized magnets 25 and 26 with insulating fasteners 27 would be employed. In this embodiment, the plane of tracks 18 and 19 would make an angle $\epsilon$ with the horizontal plane and contra-polarized magnets 25 and 26 would be secured at its lower end by insulating fasteners 27. Statorless homopolar motor 1 could rest on inclined tracks 18 and 19 and in parallel equilibrium between forces $MG_p$, the magnetic repulsion forces between 1 and 25 or 26, and the forces of friction at the points of contact. If statorless homopolar motor 1 now be energized, it can be made to climb part way up the slope and if then de-energized, permitted to roll back toward the equilibrium position which it will pass by virtue of its rectilinear and angular momentum to "bounce" off the field of 25 or 26. As it does so, an additional electrical impulse can be imparted, this time causing it to advance farther up the incline. The cycle can be repeated several times until sufficient energy has been imparted to eject 1 beyond the elevated ends of tracks 18 and 19 into a parabolic trajectory, causing it to fall to a marked playing field made of soft material for cushioning the impact and to stop the generator at markers designating the value of the attempt. If accelerating torques are altenately required in both senses, the playing skill required and the attendant interest can be measurably increased. A factor requiring additional skill can be introduced by making the angle $\epsilon$ variable.

Figure 14:
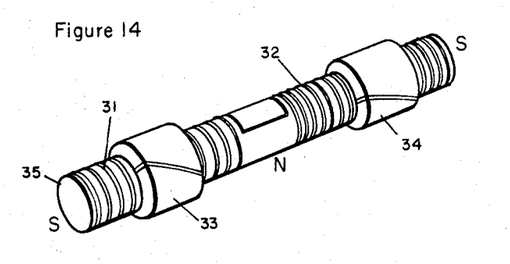
FIG. 14 is a view showing how a reaction torque generator can be made using electromagnets to generate the symmetrical contrapolarized field.

FIG. 14 illustrates a statorless homopolar motor wherein the symmetrical contra-polarized magnetic field is provided by solenoids 31 and 32 and the current is introduced through contactors 33 and 34. Here, the torque is produced by axial current reaction in passing through the irrotational magnetic field midway between contactors 33 and 34. Solenoids 31 and 32 and contactors 33 and 34 are mounted rigidly on non-conducting cylindrical tube 35. This version will function using either AC or DC excitation. However, it has a higher moment of inertia and lower performance characteristic and would generally not be preferred.

Figure 15:
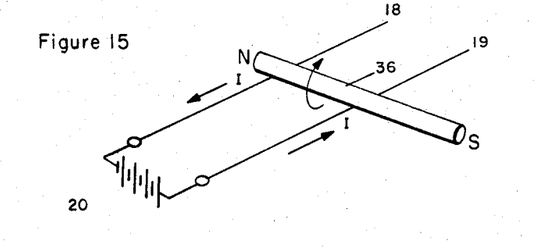
FIG. 15 shows how simple reaction torque generator performance can be demonstrated using an ordinary circular cylindrical magnet.

FIG. 15 shows how an ordinary cylindrical conducting permanent magnet 36, may be used to show how a statorless homopolar motor functions. This is nearly equivalent to magnet 13 in FIG. 3, except that less field must be crossed by the prevailing current and this results in less torque per unit current. Furthermore, the weight of statorless homopolar motor 36 is concentrated above track 19 which tends to decrease contact pressure and to increase resistance with track 18. Thus, this embodiment of my invention is not generally preferred.

Figure 16:
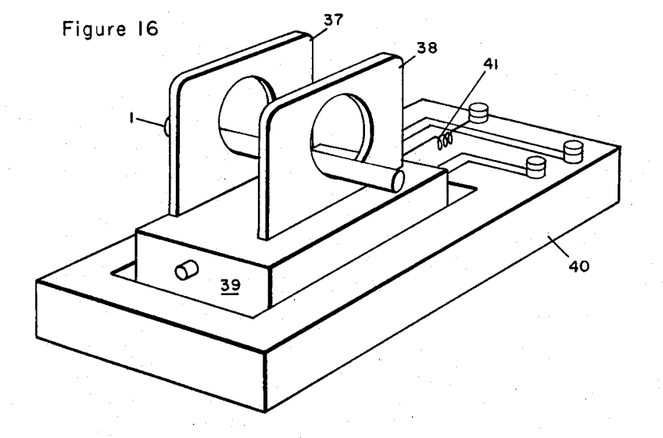
FIG. 16 shows how a statorless homopolar motor or reaction torque generator can be made to change in a circle.

A statorless homopolar motor can be made to chase in a circle. FIG. 16 shows one way in which this can effected. Parallel conducting plates 37 and 38 having coaxial holes of equal diameter spaced the same distance apart as tracks 18 and 19 and mounted on sliding block 39 are used to conduct current to statorless homopolar motor 1. Block 40 is recessed to receive sliding block 39 which it holds captive. Spring 41 is used to accelerate the sliding combination suddenly. The inertial forces cause statorless homopolar motor 1 to climb the circular track, centrifugal force holds the generator against the track, and the statorless homopolar motor supplies the friction and windage losses so that an equilibrium speed is attained.

Figure 17:
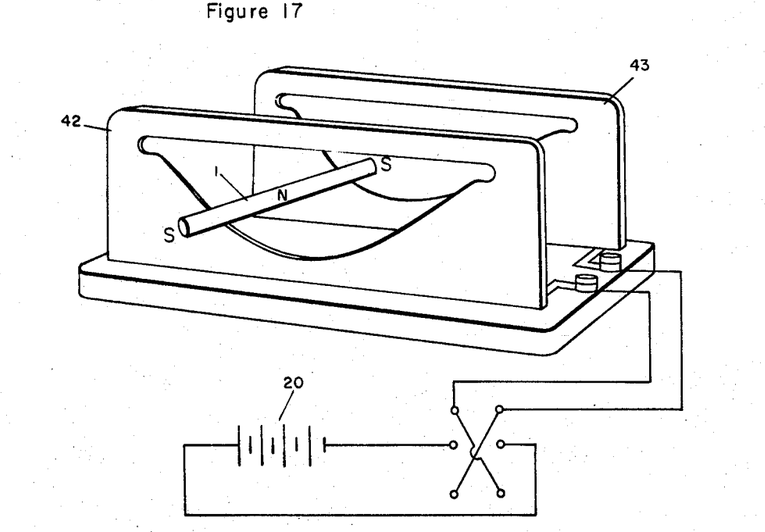
FIG. 17 is a perspective view showing how the reaction torque generator can be made to travel between two locations along fairly steep paths.

FIG. 17 shows another instructive variation. Statorless homopolar motor 1 can be made to travel down one hill, up another, and brought to rest at this peak. Subsequently, it can be returned to its origin by means of a reverse current and route. The hills need not be of equal altitudes. Tracks 42 and 43 may be shaped as shown in FIG. 17 or may incorporate several hills to increase interest.

Figures 18, 19:
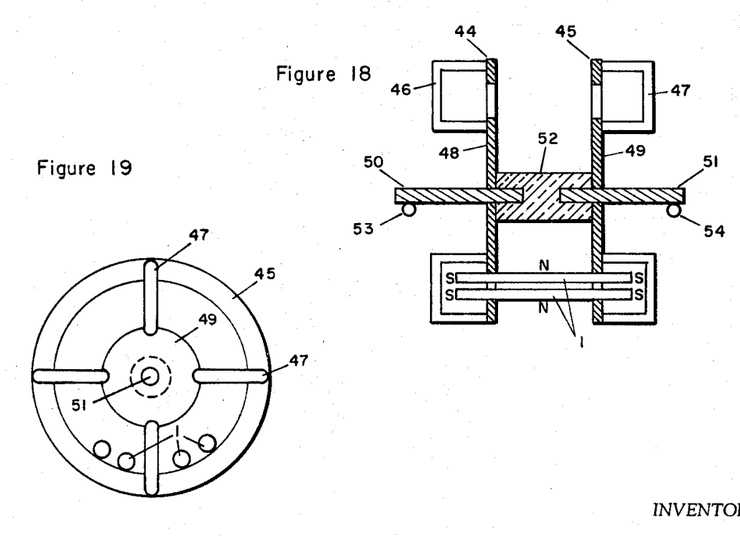
FIG. 18 is a view employing a structure wherein a number of like statorless homopolar motors or reaction torque generators rest on and receive their excitation from the inner conducting periphery of concentric, parallel, rotatably mounted circular tracks.
FIG. 19 is an end view of the arrangement shown in FIG. 18.

A multiple embodiment is shown in FIGS. 18 and 19. Here the conducting tracks 44 and 45 are parallel coaxial circles energized through members 46, 47, 48, 49, and their supporting conducting axial members 50 and 51 rigidly secured in their common insulating axial member 52. This assembly is mounted on parallel tracks 53 and 54 through which the assembly is energized. Several identical statorless homopolar motors 1 can be employed in this variation to cause the circular track assembly to become unbalanced and thus to rotate along straight tracks 53 and 54.

Figure 20:
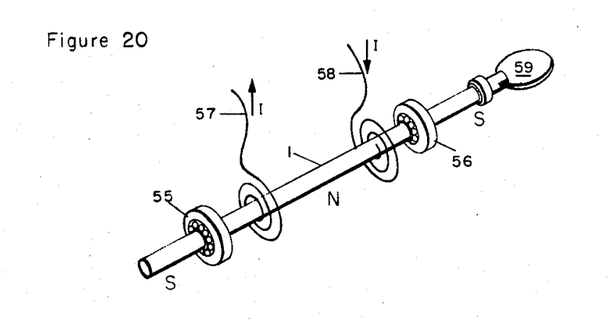
FIG. 20 is a schematic of a bearing mounted statorless homopolar torque motor or reaction torque generator wherein the radial currents are introduced through preloaded spiral springs.

FIG. 20 illustrates a statorless homopolar torquemotor 1 mounted in bearings 55 and 56 which can be energized through its preloaded helical restoring springs 57 and 58. As it can be made to rotate in either direction, it could be used to control in rotation the position of light weight components 59 such as balanced microwave or optical reflecting surfaces.

Figure 21:
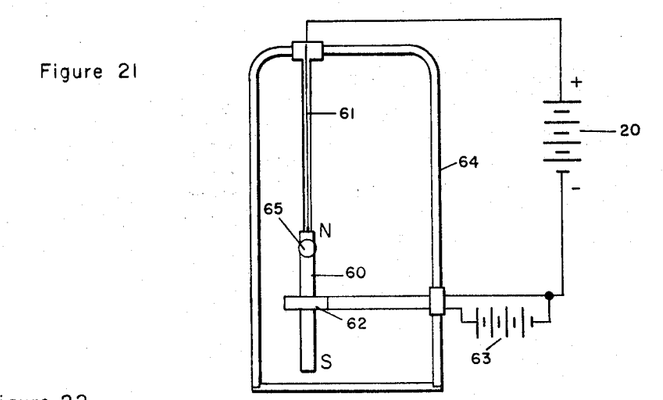
FIG. 21 shows a statorless homopolar torque motor or reaction torque generator comprised of an axially polarized magnet supported by a conducting suspension wherein current is introduced radially by means of thermionic emission.

Another species of statorless homopolar torquemotor is shown in FIG. 21. Here a circular cylindrical permanent magnet 60 is supported vertically in co-axial relation to but physically isolated from thermionic emitter assembly 62 by a conducting suspensions 61 which is electrically connected to the positive terminal of a battery 20. Thermionic electron emission from the interior surfaces of 62 causes current to flow in the statorless homopolar motor which reacts with the motor's internal magnetic field to produce torque thereon. Battery or other power source 63 provides excitation to thermionic electron emitter inside assembly 62 is housed in vacuum chamber 64. Angular position torquemotor would be measured by reflecting mirror 65.

Figure 22:
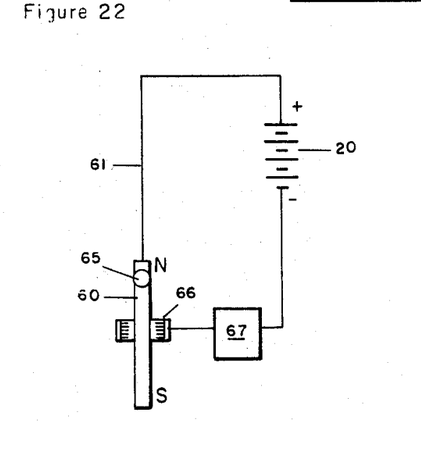
FIG. 22 shows radial current being introduced into the statorless homopolar motor or reaction torque generator using high field electron emission as the means for providing the necessary radial current.

FIG. 22 is a species of contrapolarized statorless homopolar torque motor wherein the thermionic emitter is replaced by high field emission from pointed surfaces in electrode 66. Here a bias voltage 20 provides the required positive potential through conducting suspension 61. A high voltage source 67 must be used to provide the needed electron emission. Here, the surfaces of generator 60 and surface of suspension 61 need not be insulated and a vacuum, although desirable, is not essential.

Figure 23:
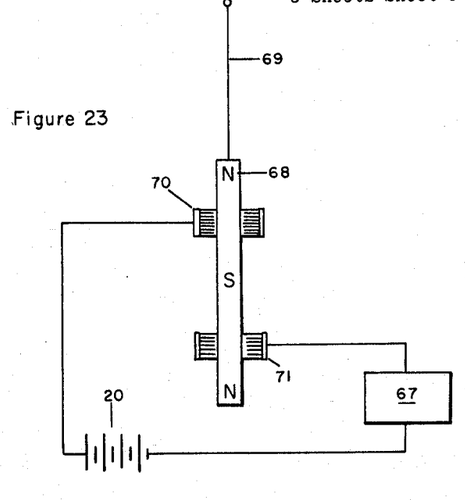
FIG. 23 shows a contrapolarized reacting torque generator supported by a suitable suspension similar to those shown in FIGS. 21 and 22 wherein the radial currents are introduced entirely by means of A.-C. high field emission with D.-C. fixing the magnetive and sense of the net torque.

FIG. 23 illustrates a contra-polarized statorless homopolar torque motor 68 supported in a vertical position by suspension 69 with the needed high field radial currents introduced by point sources 70 and 71. Again, a source of high voltage 67 is needed as well as a bias voltage 20, to establish the magnitude and sense of the statorless homopolar motor's torque. Suspension 69 need not be a conductor and although desirable, a vacuum is not required. This embodiment can torque in either sense depending upon the polarity of 20 which is not true of those embodiments shown in FIGS. 21 and 22.

Figure 24:
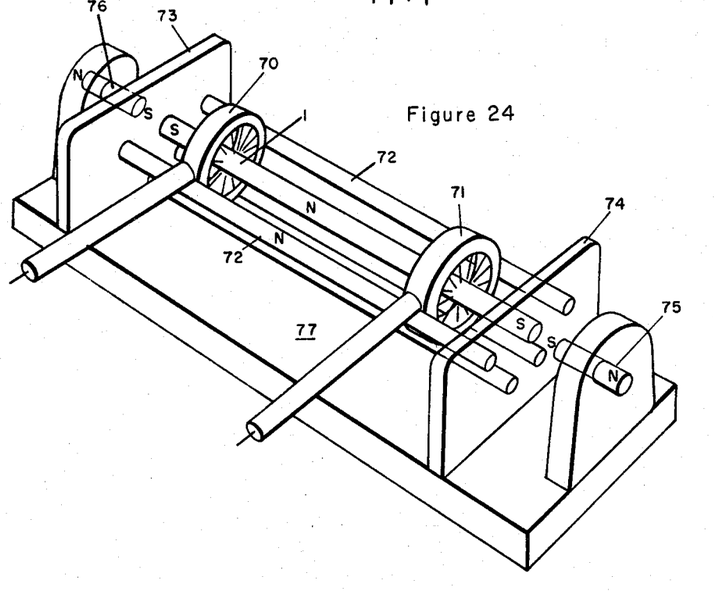
FIG. 24 is a phantom view of a statorless homopolar motor floating in the magnetic fields resulting from a number of like parallel mounted conrtapolarized magnets-wherein the motor current is introduced by means of A.-C. high field electron emission.

FIG. 24 illustrates a statorless homopolar motor 1 floated in a horizontal position by the field of like contra-polarized magnets 72 rigidly held in fixed spatial relationship with non-magnetic jigs 73 and 74. Generator 1 is free to rotate about its cylindrical axis but is axially restrained by rigidly mounted repelling magnets 75 and 76. The assembly is mounted on base 77. High field emission is used to introduce the needed radial currents through painted electrode assemblies 70 and 71. Again, a vacuum is desirable but not essential. Only the lightest loads can be handled by this device but it could be used at quite high rotational speeds because of its magnetic flotation.

Figure 25:
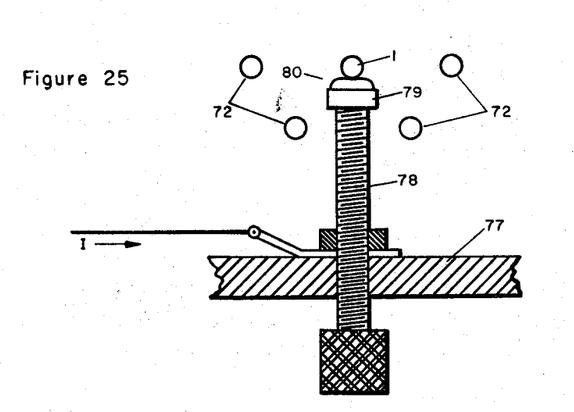
FIG. 25 is a detailed modification for introducing rotor current into the embodiment of FIG. 24 by means of direct electrical contact.

Because of the relatively low magnetic flux density at the points where current must be introduced in FIG. 24, metal (mercury) to metal (magnet) contact can be employed using the arrangement shown in FIG. 25. Conducting set screw 78 is used to adjust the height of the horizontal cup 79 containing liquid mercury 80 above base 77 so as to make metallic contact with magnetically floated statorless homopolar motor 1. This embodiment has the advantage of requiring no source of high voltage, but angular velocity of 1 must be limited well below that attainable in the embodiment of FIG. 24.

Where excessive currents and voltages are employed, there is a tendency for arcing at the points where current is conducted into the statorless homopolar motors. This results in pitting, increased contact resistance, increased rolling friction, and degraded performance in general. From equation 1 it is seen that this undesirable tendency can be minimized by employing high values of $\beta$. The statorless homopolymer motor's mass will be proportional to $R^2$ and its moment of inertia to $R^4$; to optimize statorless homopolar motor performance, it is therefore desirable to minimize R.

Arcing can be further minimized by employing a tight fitting copper or brass sleeve over the permanently magnetized rod. Where the application warrants, noble metals might be employed for the contacting surfaces.

Other embodiments of my invention will occur to those skilled in the art which do not depart from its scope and spirit.

Having described my invention in some of its embodiments, what I claim and desire to secure by Letters Patent of the United States is:

1. A statorless homopolar motor comprising a rotatably mounted single member of circular cross section having symmetrically dispersed magnetic field components therein and thereabout; current supply means adjacent said rotatable member for supplying current thereto, said current supply means having a pair of parallel, electrically isolated and conductive tracks spaced apart so as to support said single member between its opposing poles; a source of electrical current connected to said tracks; and, a current conducting path forming a portion of said single member to conduct current from said current supply means which current traverses and interacts with said magnetic field components to impose torque on said rotatable single member, thus urging it to accelerate in rotation.

2. A statorless homopolar motor according to claim 1 wherein the single member is formed of a high coercive force magnetic material which is axially contrapolarized, and the current supply means provides direct current.

3. A statorless homopolar motor consisting of:
   a first cylindrical magnet formed of high coercive force conducting material, axially contrapolarized so as to create symmetrically dispersed magnetic fields therein and thereabout;
   a pair of substantially parallel electrically isolated and conductive tracks spaced apart so as to support said first magnet between its opposite poles;
   a source of direct current connected to said tracks to supply current to said first magnet, which current reacts with said magnetic field and imposes torque upon said first magnet urging it to accelerate in rotation on said tracks;
   and at least one additional axially contrapolarized magnet which is fixed in position on said tracks and electrically isolated therefrom to superpose translatory thrusts on said first magnet and affect its motion along said tracks.

4. A statorless homopolar motor according to claim 1 wherein a second oppositely polarized single member is held below and in electrical contact with said tracks in substantially parallel suspension with said first member by the prevailing magnetic fields thereof so that when current is caused to flow therein said members torque in opposite senses and roll along said tracks together in the same direction.

5. A statorless homopolar motor consisting of:
   a cylindrical rotatably mounted single member of high coercive force conducting magnetic material axially contrapolarized so as to create symmetrically disposed magnetic fields therein and thereabout;

current supply means for conducting a direct current through said single member to interact with said magnetic fields and impose torque upon said single member urging it to accelerate in rotation;

a horizontal arrangement of at least two substantially parallel, like, contrapolarized magnets annularly arranged and spaced apart to float said single member in equilibrium between the resultant repulsion magnetic fields and the existing gravity field; and two repelling magnets disposed one at each end of said single member to restrict the axial motion of said floated single member.

6. A statorless homopolar motor consisting of:

a plurality of circular balanced substantially parallel tracks arranged to rotate together;

means for introducing electric excitation at the axis of said tracks;

a plurality of single rotatable elements of high coercive force conducting magnetic material axially contrapolarized so as to create symmetrically disposed magnetic fields therein and thereabout, said elements rotatably disposed on said circular tracks;

said elements torquing in the same direction to unbalance the tracks in the gravitational field and causing rotational acceleration in the elements and the tracks when the tracks are electrically excited.

References Cited
UNITED STATES PATENTS 351,903  11/1886  Fickemeyer _________ 310—178

MILTON O. HIRSHFIELD, *Primary Examiner.*

D. F. DUGGAN, *Assistant Examiner.*